United States Patent [19]

Shearin

[11] 4,145,066
[45] Mar. 20, 1979

[54] EMERGENCY EXIT STEP FOR SCHOOL BUS

[76] Inventor: Nadeane P. Shearin, 560 Hillview Dr., Lebanon, Oreg. 97355

[21] Appl. No.: 840,579

[22] Filed: Oct. 11, 1977

[51] Int. Cl.² .............................................. B60R 3/02
[52] U.S. Cl. ................................................... 280/166
[58] Field of Search ............ 280/166, 164 R; 182/89, 182/91, 97

[56] References Cited

U.S. PATENT DOCUMENTS

| | | | |
|---|---|---|---|
| 2,409,418 | 10/1946 | Carmichael | 280/166 |
| 3,330,577 | 7/1967 | Mills | 280/166 |

Primary Examiner—Robert R. Song

Attorney, Agent, or Firm—Oliver D. Olson

[57] ABSTRACT

A mounting base secured to the rear bumper of a school bus pivotally supports at least one step plate for movement between an operative horizontal position extended rearwardly of the bumper for use by children exiting the bus by way of the rear emergency door, and a retracted vertical position extended upwardly adjacent the rear end of the bus. A catch mounted on the emergency door of the bus is arranged to extend downward sufficiently to overlap the retracted step and secure it in retracted position when the emergency door is closed. When the door is opened, the catch is moved therewith away from the step, whereupon the latter swings downward to the operative horizontal position.

11 Claims, 4 Drawing Figures

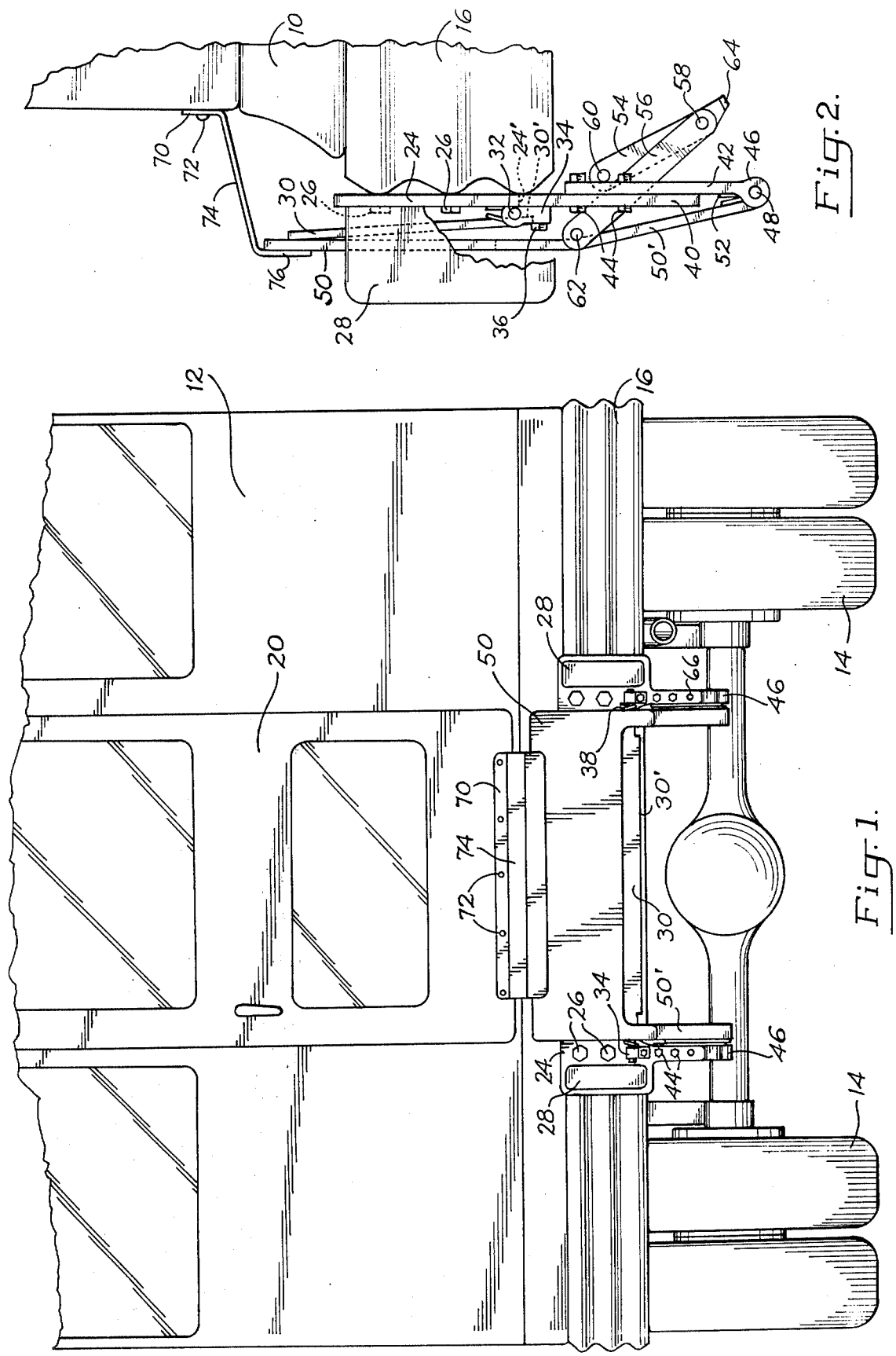

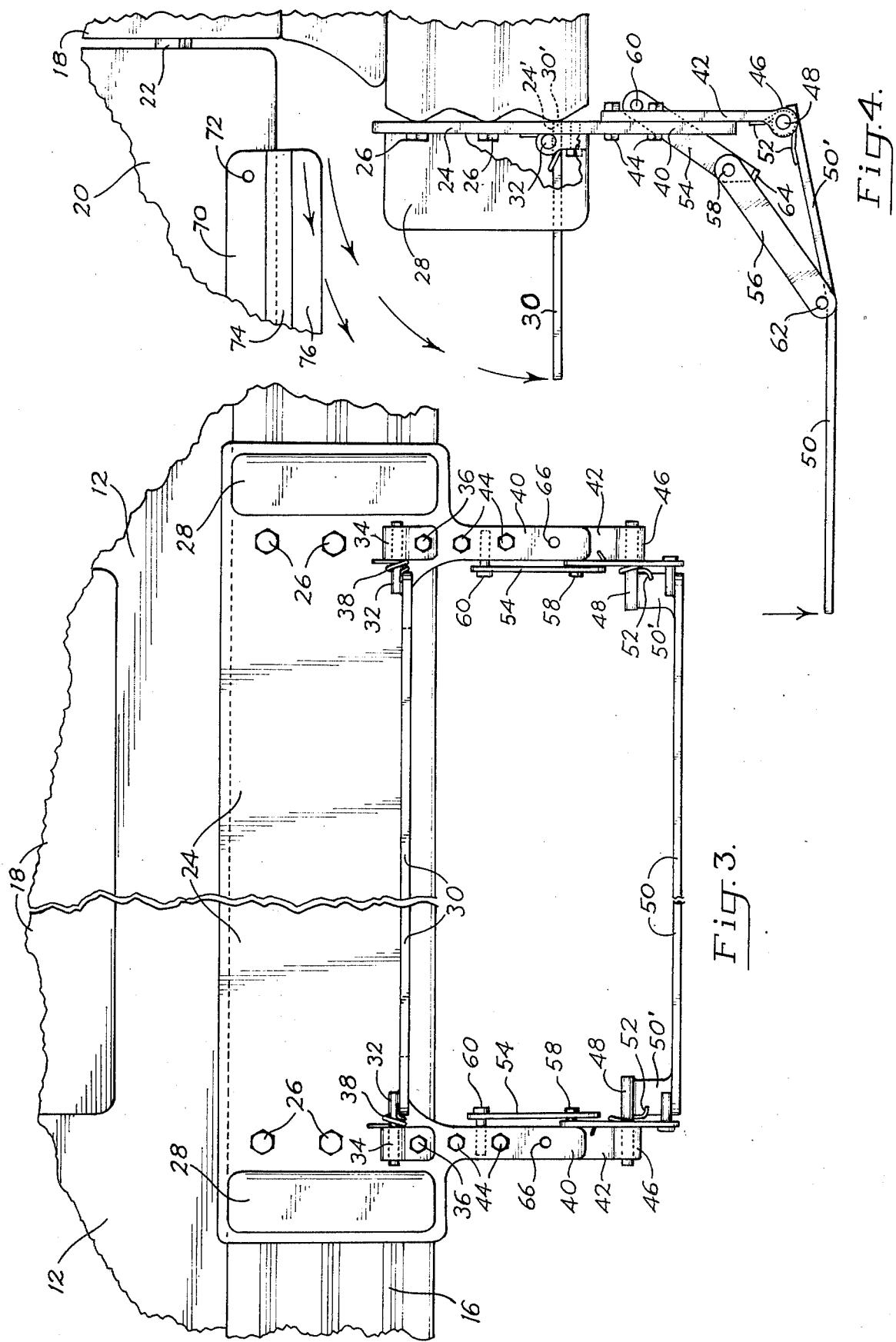

EMERGENCY EXIT STEP FOR SCHOOL BUS

BACKGROUND OF THE INVENTION

This invention relates to vehicle doors, and more particularly to a step for use in exiting a vehicle through a door opening.

Although the step of this invention has a wide variety of uses, it is of particular utility in association with an emergency exit door of a school bus. The interior floor of a conventional school bus is disposed about three and one-half feet above ground. Accordingly, a serious hazard is presented to school children who, during an emergency evacuation of the bus, must jump to the ground. Since the jump often results in the children falling to the ground, serious injuries result not only from the jump itself, but also because the panic situation results in children jumping onto those who have preceded them from the bus and lay fallen in the path of those following.

Retractable steps have been provided heretofore for association with vehicle doors. They are characterized generally by complex and costly structures which interconnect the door and step so that the step is made to extend and retract simultaneously with opening and closing of the door. Such an assembly must either be integrated into the bus during its manufacture, or substantial modification of the bus is required for the subsequent addition of the step. In either case the excessive cost of manufacture, installation and maintenance renders such prior structures economically impracticable.

SUMMARY OF THE INVENTION

In its basic concept, this invention provides a step which is supported on a vehicle adjacent a door thereof for pivotal movement between an operative horizontal position extended outwardly of the door opening when the door is open and a retracted vertical position extended upwardly adjacent the door opening and held releasably in said retracted position by a catch mounted on the door and overlying the step when the door is closed.

It is by virtue of the foregoing basic concept that the principal objective of this invention is achieved; namely, to overcome the aforementioned disadvantages and limitations of prior vehicle door step structures.

Another objective of this invention is the provision of a vehicle door step of the class described which is connected to the vehicle door only by a releasable catch when the step is retracted manually and the door is closed, the step being moved to operative position by gravity automatically when the door is opened.

Still another objective of this invention is the provision of a vehicle door step of the class described which may include a plurality of steps which are movable simultaneously to operative position at different elevations above ground level.

A further objective of this invention is the provision of a vehicle door step of the class described which may be provided as an integrated unit capable of being mounted on a variety of types of vehicles with speed and facility and minimum modification of the vehicle.

The foregoing and other objects and advantages of this invention will appear from the following detailed description, taken in connection with the accompanying drawings of a preferred embodiment.

BRIEF DESCRIPTION OF THE DRAWINGS

FIG. 1 is a fragmentary rear elevation of a school bus showing mounted thereon an emergency exit step assembly embodying the features of this invention, the steps being shown in retracted position with the emergency exit door closed.

FIG. 2 is a fragmentary side elevation as viewed from the right in FIG. 1.

FIG. 3 is a fragmentary, foreshortened rear elevation showing the emergency exit step assembly of FIG. 1 in operative position, with the emergency exit door of the bus opened.

FIG. 4 is a fragmentary side elevation as viewed from the right in FIG. 3.

DESCRIPTION OF THE PREFERRED EMBODIMENT

In the drawings there is shown for purposes of illustration the rear end portion of a school bus. It includes the side and rear walls 10 and 12 of the bus body which is mounted upon a frame (not shown) supported on wheels 14. A rear bumper 16 is secured to the bus frame, and an opening 18 in the rear wall is removably closed by an emergency exit door 20 which is supported on hinges 22 for swinging movement about a vertical axis.

In accordance with this invention, at least one step is mounted on the vehicle adjacent the door opening for pivotal movement between an operative, horizontal position extended outwardly from the door opening and a retracted vertical position extended upwardly adjacent the door opening and held releasably in said retracted position by a catch mounted on the door and overlying the step when the door is closed.

In the embodiment illustrated, the step assembly is an integrated unit which is adaptable for attachment to the vehicle. It includes the mounting base plate 24 which is arranged to be placed in abutment with the rear surface of the rear bumper, below the door opening in the rear wall of the bus. Holes are drilled through the bumper in registry with holes provided in the base plate for the reception of anchor bolts 26 by which the base plate is secured to the bumper.

In the preferred embodiment illustrated, the lateral end portions of the base plate each mounts a block 28 of rubber of other resilient material which projects rearwardly therefrom and functions as a bumper guard, in well known manner, and also protects the step assembly against damage.

A step plate 30 is mounted pivotally on the base plate 24 between the bumper guards. As illustrated, a pivot pin 32 is secured, as by welding, to the inner side of the step plate at each of the lateral sides thereof. The pivot pins extend laterally beyond the sides of the step plate and are journaled in bearings 34. The bearings are secured to the outer side of the base plate, as by means of screws 36 which extend through openings in the bearings for threaded engagement with registering threaded bores in the base plate.

It is to be noted, particularly in FIG. 2, that the pivot pins 32 for the step plate are offset inwardly thereof. By this means the center of gravity of the retracted step plate is disposed outwardly of the pivot axis of pins 32. Accordingly, when the step plate is released from the retracted position illustrated in FIG. 2, it swings by gravity in the counterclockwise direction about the axis of the pivot pins, to the operative, horizontal position illustrated in FIG. 4. In this position the inwardly projecting central portion 30' of the step plate is brought into abutment with the bottom transverse edge 24' of the base plate.

If desired, resilient means may be utilized to assist gravity in urging the step plate toward its operative, horizontal position. Such resilient means is illustrated in the drawings as a coil spring 38 which surrounds an intermediate portion of each pivot pin 32, with one end of the spring engaging the base plate and the opposite end of the spring engaging the step plate.

In the preferred embodiment illustrated, the step assembly includes a second, lower step by which to afford easier and safer exit from the bus, by providing a step at elevations of one-third and two-thirds the distance between the floor of the bus body and ground level. For this purpose the base plate 24 is provided with laterally spaced, downward extensions 40. Each is arranged to secure an arm 42 thereto, as by means of the pairs of bolts 44 extended through aligned openings in the base plate extensions and arms.

The lower end of each arm supports a bearing 46 for the mounting of a pivot pin 48 which extends laterally outward from an inwardly projecting lateral extension 50' of the second step plate 50. The pivot pins are secured, as by welding, to the inner sides of the extensions, whereby the center of gravity of the step plate is offset from the pivot axis 48 when in retracted position. Thus, as described hereinbefore in connection with the upper step 30, the lower step also may swing by gravity counterclockwise from the retracted position illustrated in FIG. 2 to the operative position illustrated in FIG. 4. This gravitational movement may be supplemented by the additional resilient force of the coil springs 52 which encircle the pivot shafts 48 and engage at one end against the associated bearing arm 42 and at the opposite end against the extension 50' of the second step plate 50.

The operative horizontal position of the second step 50 may be determined in a variety of ways. In the embodiment illustrated, a pair of links 54 and 56 at each side of the second step, are joined together at overlapping ends by means of a pivot pin 58. The outer end of link 54 is secured pivotally to the associated arm 42 by a pivot pin 60, and the opposite end of the other link 56 is connected pivotally to the associated extension 50' of the second step plate by a pivot pin 62. An end portion of the link 54 is offset 90° in the direction of the other link 56 to form a stop 64 by which to limit the outward divergence of the pair of links. Accordingly, the pairs of links establish the operative, horizontal position of the step and also fold downwardly automatically as the lower step is swung upwardly to the retracted position illustrated in FIG. 2.

The laterally spaced downward extensions 40 of the base plate 24 may be provided with one or more additional openings 66 for the selected reception of the attachment bolts 44, to permit vertical adjustment of the operative position of the lower step 50. Thus, as illustrated, the additional openings 66 in the base plate extensions allow the lower step to be lowered from the position illustrated a distance corresponding to the distance between the openings 66 and the openings occupied by the lower bolts 44. The base plate extensions obviously may be extended downward further than illustrated, to accommodate still further lowering of the lower step.

Similarly, the upper step 30 may be adjusted vertically by removing the anchor screws 36 for the bearings, lowering the bearings so that the openings therein register with appropriate ones of the openings for bolts 44 in the downward extensions of the base plate.

By this means the vertical spacing between the steps may be varied as desired, to accommodate different floor heights of vehicles. Further, the lower step 50 may be omitted and the upper step 30 lowered to a desired position accommodated by the openings in the downward extensions 40 of the base plate 24.

As previously mentioned, means is provided for retaining the steps in the upwardly retracted position (FIG. 2) when the vehicle door 20 is closed, and to allow the steps to swing downward to operative position automatically when the door is opened. For this purpose the inner portion 70 of a catch member is secured to the outer lower surface of the door, as by means of bolts 72. An intermediate portion 74 of the catch member extends rearwardly of the door and the outer end portion 76 of the catch member then extends downward sufficiently to overlap the outermost retracted step 50. In this regard, it is to be noted that in the event the lower step is omitted, the catch still overlaps the upper end of the retracted upper step 30. In the event either or both of the steps are adjusted vertically downward, as desired for a particular installation, the catch secured to the door will be provided with a downward outer portion 76 of sufficient length to overlap the upper end of the outer step.

The operation of the vehicle door step assembly described hereinbefore is as follows: Let it be assumed that the step assembly is mounted, as illustrated, on the rear bumper 16 of a school bus for cooperative association with an emergency exit door 20. Upon the occurrence of an emergency, requiring removal of the students from the bus, the emergency door is unlatched and swung outwardly about the vertical axis of its mounting hinges 22. The catch member thus is swung outwardly with the door, from the position illustrated in FIG. 2 to the position illustrated in FIG. 4. The outer portion 76 of the catch member thus is moved away from its overlapping arrangement with respect to the step 50, whereupon both of the steps swing counterclockwise, by gravity, aided by the resilience of the coil springs 38 and 52, to the operative horizontal position illustrated in FIG. 4.

This movement of the steps to their operative, horizontal positions occurs rapidly, simultaneously with the opening of the emergency exit door, so that the steps are in proper position for immediate use by the school children. Accordingly, the bus may be evacuated quickly and with maximum safety to the children.

The steps are returned to the retracted position illustrated in FIG. 2 by the manual lifting of the lower step 50 arcuately upward clockwise about the axis of its pivot pins 48. During this upwardly swinging movement of the lower step, it is brought into engagement with the upper step 30, thereby causing the latter also to be swung upward clockwise about the axis of its pivot pins 32. When the two steps are brought to the retracted position illustrated in FIG. 2, the emergency exit door 20 is swung closed and latched, whereupon the downwardly projecting outer end portion 76 of the catch member is brought into overlapping engagement with the upper end of the outermost step 50. The assembly thus is secured in readiness for subsequent use automatically upon opening of the door.

It will be apparent that the step assembly of this invention may be associated with a wide variety of types and sizes of vehicles. For example, the base plate 24 may be secured at any appropriate position on the vehicle body, for example along the side or other location of an exit door of a bus, mobile home, camper or other form of vehicle. If desired, the base plate may be omitted and one or both of the steps secured directly to the body of the vehicle. The integrated assembly illustrated is preferred, however, since it minimizes modification of the vehicle and simplified installation and maintenance.

It will be apparent to those skilled in the art that the foregoing and other modifications and changes may be made in the size, shape, type, number and arrangement of parts described hereinbefore without departing from the spirit of this invention.

Having now described my invention and the manner in which it may be used, I claim:

1. For use with a vehicle body having an exit opening and door removably closing said exit opening, a step assembly comprising;
   a. a step member,
   b. pivot means for mounting the step member on the vehicle in registry with the exit opening in the body thereof for movement independently of the door between an operative position extending horizontally outward of the vehicle body below the exit opening therein and a retracted position extending vertically upward adjacent the vehicle body, and
   c. a catch member adapted to be secured to the door associated with the exit opening in the vehicle body and arranged, when the door is closed, to overlap the retracted step member and secure the latter in said retracted position and arranged, when the door is open, to allow the step member to pivot to said operative position.

2. The step assembly of claim 1 including resilient means engaging the step member for urging the latter resiliently toward said operative position.

3. The step assembly of claim 1 wherein the pivot means includes a pivot axis on the step member offset inwardly of the center of gravity of the step member when in said retracted position, whereby when the exit door is open the step member pivots by gravity to said operative position.

4. The step assembly of claim 3 including resilient means engaging the step member for urging the latter resiliently toward said operative position.

5. The step assembly of claim 1 including a base member supporting the pivot means and step member and arranged for attachment to a vehicle independently of the vehicle door.

6. The step assembly of claim 5 wherein the exit opening is in the rear wall of a vehicle body above a rear bumper, the base member is arranged to overlie said rear bumper, and spaced bumper guards are mounted on the base member laterally outward of the opposite ends of the retracted step member, the bumper guards extending rearwardly beyond the retracted step member.

7. The assembly of claim 1 including
   a. a second step member, and
   b. second pivot means for mounting the second step member on the vehicle below the first named step member for movement between an operative position extending horizontally outward below and beyond the operative position of the first named step member and a retracted position extending vertically upward adjacent and outwardly of the first named step member,
   c. the catch member being arranged, when the door is closed, to overlap the retracted second step member and secure both step members in said retracted position and arranged, when the door is open, to allow both step members to pivot to their operative positions.

8. The step assembly of claim 7 including resilient means engaging each step member for urging the latter resiliently toward its operative position.

9. The step assembly of claim 7 wherein said pivot means includes a pivot axis on the associated step member offset inwardly of the center of gravity of the step member when in said retracted position, whereby when the exit door is open both step members pivot by gravity to their operative positions.

10. The step assembly of claim 9 including resilient means engaging each step member for urging the latter resiliently toward its operative position.

11. The step assembly of claim 7 including a base member supporting both pivot means and associated step members and arranged for attachment to a vehicle.